United States Patent [19]
Even

[11] Patent Number: 6,018,523
[45] Date of Patent: Jan. 25, 2000

[54] SWITCHING NETWORKS HAVING IMPROVED LAYOUTS

[75] Inventor: Shimon Even, Watchung, N.J.

[73] Assignee: Lucent Technologies, Inc., Murray Hill, N.J.

[21] Appl. No.: 08/955,685

[22] Filed: Oct. 22, 1997

[51] Int. Cl.[7] .......................... H04L 12/28; H04L 12/56; H04Q 19/00
[52] U.S. Cl. ............... 370/389; 340/825.79; 340/825.89
[58] Field of Search ......................... 340/825.79, 825.89; 370/389, 411, 422, 429, 254, 360, 354

[56] References Cited

U.S. PATENT DOCUMENTS

| | | | |
|---|---|---|---|
| 3,701,112 | 10/1972 | Hagelbarger | 340/172.5 |
| 4,833,468 | 5/1989 | Larson et al. | 340/825.8 |
| 4,988,993 | 1/1991 | Hwang et al. | 340/825.8 |
| 5,153,843 | 10/1992 | Batcher | 364/491 |
| 5,471,468 | 11/1995 | Sandin et al. | 370/60 |

*Primary Examiner*—Alpus H. Hsu
*Assistant Examiner*—Duc Ho

[57] ABSTRACT

Improved layouts for switching networks having N·log N switching circuits, and improved switches incorporating such layouts, are disclosed. An improved layout reduces grid-area requirements for Benes switching network to an area of less than $3N^2$ grid units. The improved layout results from positioning the various switching circuits at certain defined locations. Unlike conventional layouts of the Benes network, the switching circuits are aligned in only one direction, e.g., columns but not rows, and the links connecting switching circuits are slanted.

12 Claims, 5 Drawing Sheets

SWITCHING NETWORKS HAVING IMPROVED LAYOUTS

FIELD OF THE INVENTION

The present invention relates to switching networks. More particularly, the invention relates to a reduced-area layout for switching networks.

BACKGROUND OF THE INVENTION

Switching networks are useful as fast circuits for routing data. Switching networks consist of input terminals, a plurality of switching circuits, interconnections or links, and output terminals. A switching circuit is operable to route two signals appearing at its inputs to either of two outputs. The route through the switching circuit is dictated by an external controller. Switching networks are useable, for example, in telephone switchboards, the switching fabric of Asynchronous Transfer Mode (ATM) switches and the like.

It is desirable to implement switching networks into an ever-decreasing area within an electrical circuit. A given network has, however, a characteristic number of switching circuits as a function of the number of network inputs. But, there are at least two degrees of freedom available for use in developing a network layout. A first is the layout of network switching circuits, i.e., their placement on a grid relative to one another. A second is the layout of the interconnects linking such switching circuits. In fact, those two aspects of a network layout may be of paramount importance in determining network area requirements.

SUMMARY OF THE INVENTION

The present invention is directed to a layout for a switching network having N·log N switching circuits. That switching network, which is attributed to V. Benes and A. Waksman, is commonly referred to as the "Benes" switching network. See, V. E. Benes, *Mathematical Theory of Connecting Networks and Telephone Traffic*, (Academic Press, 1965); A. Waksman, "A Permutation Network," J. ACM, v. 15, no. 1, pp. 159–63 (January 1968). Those publications, and any other publications or patent applications referenced in this specification, are incorporated by reference herein.

The area required for implementing a network can be determined by developing a grid layout for the network. The grid layout encompasses the various interconnect permutations required within the network. According to the present invention, the Benes switching network can be laid-out in an area of $3N^2$ or fewer grid units for a network of N inputs. In a hitherto unknown arrangement, the switching circuits comprising the network are arranged in columns, but not necessarily in rows, as in conventional arrangements. The present arrangement advantageously facilitates using links, for interconnecting switching circuits, which are "slanted," in substantial portion, relative to the arrangement of switching circuits in the columns. In some embodiments, the links are slanted by 45°. Conventional layouts of the Benes network do not use slanted links. The links used in conjunction with the present invention are either straight slanted lines, or have at most one bend, in comparison with prior art layouts having links with as many as four bends. Such bends increase network layout area requirements and complicate fabrication. A layout of the Benes switching network in accordance with the present invention advantageously requires significantly less grid area than conventional layouts of same.

BRIEF DESCRIPTION OF THE DRAWINGS

Further features of the invention will become more apparent from the following detailed description of specific embodiments thereof when read in conjunction with the accompanying drawings, in which.

DETAILED DESCRIPTION OF THE INVENTION

An exemplary switching network has N input terminals and N output terminals and a plurality of switching circuits and interconnects or links. If N signals, representing N values, such as, for example, real numbers or address values, are fed into the input terminals, the same signals appear on the output terminals. Switching networks can be implemented to process electronic, optical or other types of signals. For clarity and ease of presentation, such signals will hereinafter be referred to as "numbers." Further, as used herein, the term "vector" is defined as a sequence of signals. It will be appreciated that the physical implementation of the network will vary depending upon the signal-type being processed, such as, for example, an electrical or an optical signal type.

Figure 1:
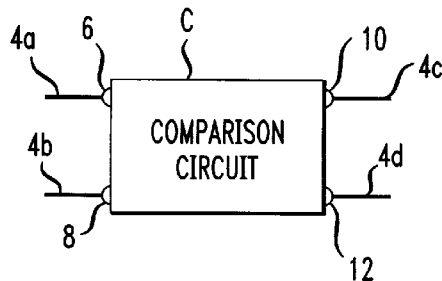
FIG. 1 shows a simplified illustration of a switching circuit C.

FIG. 1 shows a simplified illustration of a switching circuit C. Such a switching circuit is well known in the art, and contains logic circuits, memory (for synchronization), and the like. The switching circuit C has two input terminals 6, 8 and two output terminals 10, 12, as illustrated in FIG. 1. If two numbers x, y are fed to the two inputs 6, 8, the same numbers x, y emerge on the output terminals 10, 12. A controller, not shown, determines the routing through the switching, dictating on which output 10, 12 a given input number will appear. To simplify the following description, designations for numbers (signals) delivered to the terminals, and the terminals receiving such numbers, will be used interchangeably.

The networks described herein also have fixed interconnects or links, such as the fixed interconnects 4a–d shown in FIG. 1. Such interconnects are normally implemented, for example, as conductive traces patterned on and throughout integrated circuits, or as optical waveguides in optical circuits. All such interconnects are directed links connecting a network input terminal, not shown, or a switching circuit output terminal to a switching circuit input terminal, or a network output terminal, not shown.

A grid can be used to assist in laying out a network. As defined herein, a grid consists of a first and a second set of straight lines. In each of such sets, the lines are parallel. It is assumed herein that the distance between any two adjacent parallel lines is the same as the distance between any other two adjacent parallel lines, though such distance can vary. That distance is assumed to be equal to one unit, referred to herein as a "grid segment." Moreover, the lines of the first set may lie in any non-zero angle with respect to the lines of the second set. For clarity of presentation, that angle is assumed herein to be ninety degrees, i.e., the lines of the first set are orthogonal to those of the second set. Based on the foregoing assumptions, the grid is a square. The grid points are the points of intersections of the lines of the first set with the lines of the second set.

Figure 2:
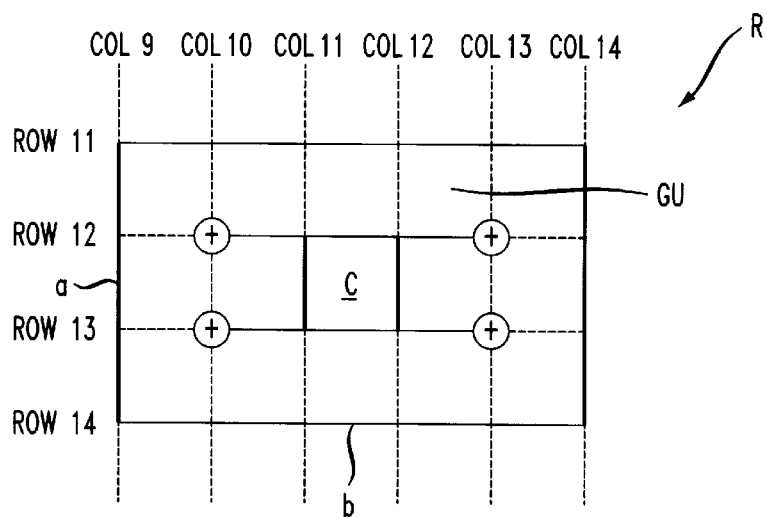
FIG. 2 shows a portion of an exemplary grid for laying out a network and a representation of grid area.

FIG. 2 shows a portion of such a grid. For clarity of presentation, in the grid portion shown, the first and second sets of straight lines are oriented vertically as "grid columns," and horizontally as "grid rows." The grid portion shown is defined by grid columns co19–col14 and grid rows row11–row14. Two adjacent grid columns, such as col12 and col13, intersect two adjacent grid rows, such as row11 and row12, defining a unit area GU of the grid. For example, the grid area encompassed by a region bounded by grid columns col9–col14 (side a), and grid rows row11–row 14 (side b) is fifteen grid units (GU).

It should be understood that a grid unit GU is not arbitrarily small. A grid unit has a minimum size dictated by the state-of-the-art in device fabrication, particularly in terms of minimum feature size, prevailing at any given point in time. For example, assume it is determined that a sorting network requires an area of G grid units. It will be appreciated that the absolute area, as measured in square microns or square millimeters, required to implement such a network using technology current in, say 1970, is significantly greater than the area required for implementation using technology current in 1997. The layout areas presented herein are described in terms of "grid units." It should now be appreciated that a grid unit is a relative measure, and not an absolute measure, of layout area.

Semiconductor chips are typically laid out in rectangular regions. Thus, the area required for a layout of a switching network is the area (measured in grid units) of the smallest rectangle that contains such a layout. The grid area of a layout is defined as the least number of grid units in a rectangle that encompasses the layout.

If R is an a×b rectangle, then rectangle R contains at least $[(a-1)\cdot(b-1)]-1$ grid points and at most $(a+1)\cdot(b+1)$ grid points, no matter how the rectangle R is oriented with respect to the grid. For example, for the rectangle R shown in FIG. 2, a=3 vertical grid segments and b=5 horizontal grid segments, and the number of grid points encompassed by R is $(3+1)\cdot(5+1)=24$. The sides of R need not be parallel to the grid lines and the quantities a and b need not be integers. When a and b are large, the number of grid points is approximately equal to the area of the rectangle in grid units.

It is possible to represent a switching network by a directed graph, wherein switching circuits and network terminals are considered to be vertices, and the interconnects or links are directed edges. The following rules and definitions will be used herein with regard to embedding such a graph in a grid. First, the vertices of a graph are mapped to grid-points, with no more than one vertex per grid-point. Second, every edge of the directed graph is represented by a path in the grid, but no grid edge is used in more than one such path. Such a mapping of the graph edges to grid paths is referred to herein as "edge-disjoint" mapping. Two paths may share an intermediate grid-point, but they must cross at that point, i.e., no "knock-knee" or change in direction is allowed. Third, if a vertex is mapped to a grid-point, then all paths representing graph edges incident on this vertex must begin or end at that grid-point, and no path is allowed to pass through that point.

Figure 3:
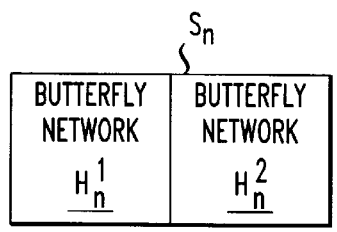
FIG. 3 shows a conceptual illustration of the Benes switching network.

The Benes switching network utilizes N·log N switching circuits, and has a network depth of 2 log N. As illustrated in FIG. 3, the Benes switching network $S_n$ consists of two Butterfly networks, $H_n^1$, $H_n^2$, well known to those skilled in the art, that are connected "back-to-back." One known layout of the Butterfly network is the layout of D. S. Wise. See D. S. Wise, "Compact Layouts of Banyan/FFT Networks," *VLSI Sytems and Computations*, (G. Steele et al., eds.), pp. 186–95, (Computer Science Press, 1981). Wise's layout of the Butterfly network is not directly applicable for use in laying out the Benes switching network; i.e., one cannot simply use Wise's layout for connecting two butterfly networks, back-to-back, to obtain a Benes network.

In particular, the Wise layout is for the case wherein the network inputs and outputs are vertices (of degree 2), and the routing paths are vertex disjoint. In addition, Wise's layout includes knock-knees. In the version of the Benes network to which the present invention pertains, the inputs are edges (or vertices of degree 1), and the routing paths are only required to be edge-disjoint.

In accordance with the present invention, a layout of the Butterfly network has been discovered that is suitable for back-to-back connection and satisfies the other previously-described rules and definitions. Such a layout can therefore be used to construct a layout of the Benes network.

Consider the Benes network $S_n$, wherein the number, N, of inputs equals $2^n$. Such a network is isomorphic to the Benes network with N/2 input/output vertices, when two input (output) edges are attached to each input (output) vertex. Such a network can map each of the N inputs to the N outputs via edge disjoint paths. The term isomorphic, as used herein, is meant to indicate structural equivalence implying that isomorphic networks are characterized by the same depth and number of switching circuits. For a further description of the term "isomorphic," as used in conjunction with networks generally, and, more particularly, as intended herein, see G. Bilardi entitled "Merging and Sorting Networks with the Topology of the Omega Network," IEEE Trans. Comp., v(38), no. 10, pp. 1396–1403, October 1989.

For clarity of presentation, one half of the present layout for the Benes network $S_n$ is described below. Such a "half" net, denoted $H_n$, has N input edges and N/2 output vertices. Such a layout is, in fact, the Butterfly network for (n–1) with two input edges attached to each of the input vertices. Reflecting $H_n$ about its output vertices to effectively create a back-to-back connection, yields a layout of the Benes network $S_n$ with N input/output edges.

Figure 4:
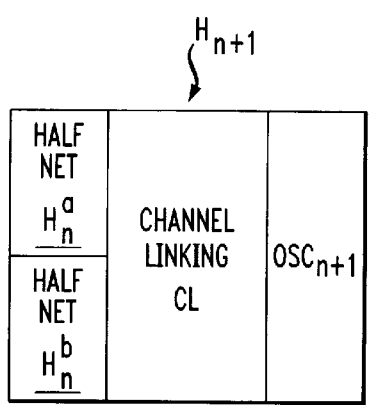
FIG. 4 shows the conceptual structural representation of a layout of one half of the Benes network $H_{n+1}$, in accordance with the present invention.

A conceptual structural representation of $H_{n+1}$, in accordance with the present invention, is shown in FIG. 4. Description of the recursive structure of the "half" net $H_n$ is facilitated by examining network construction and related elements in terms of the "n+1st" level.

$H_{n+1}$ comprises two copies of the net $H_n$, $H_n^a$ and $H_n^b$, placed one above the other, a column $OSC_{n+1}$ of switching circuits, and channel linking CL for bringing together an output from $H_n^a$ and an output from $H_n^b$ at each of the switching circuits in column $OSC_{n+1}$. FIGS. 5a–5d show a detailed layout of $H_n$ according to the present invention for n=1–4, respectively.

Figure 5A:
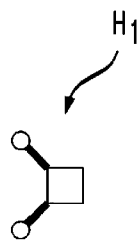
FIGS. 5a–5d show a layout of $H_1$–$H_4$ in accordance with the present invention.
Figure 5B:
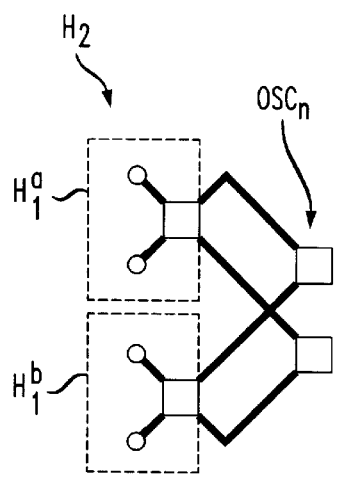
Figure 5C:
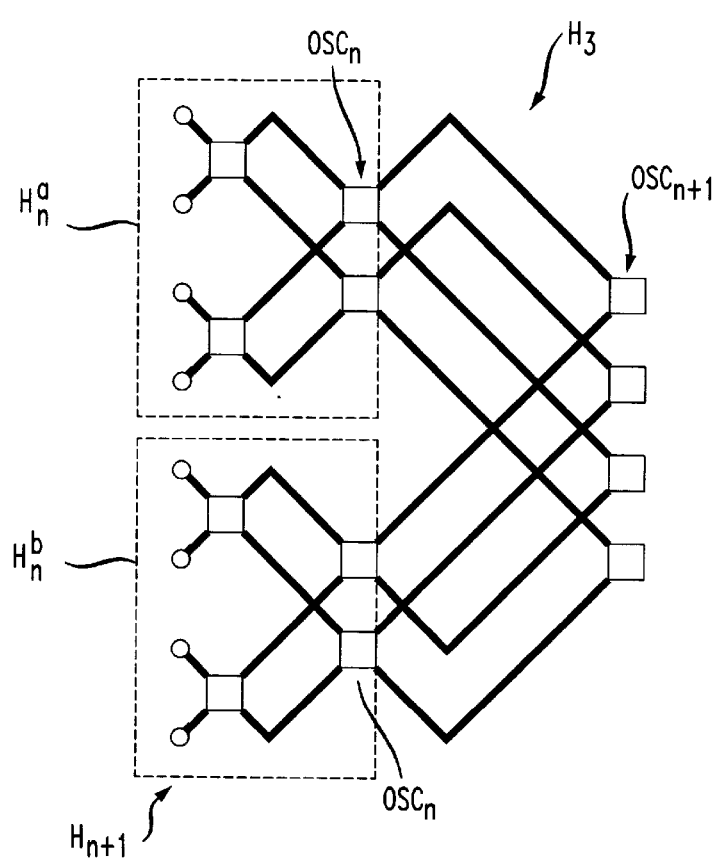
Figure 5D:
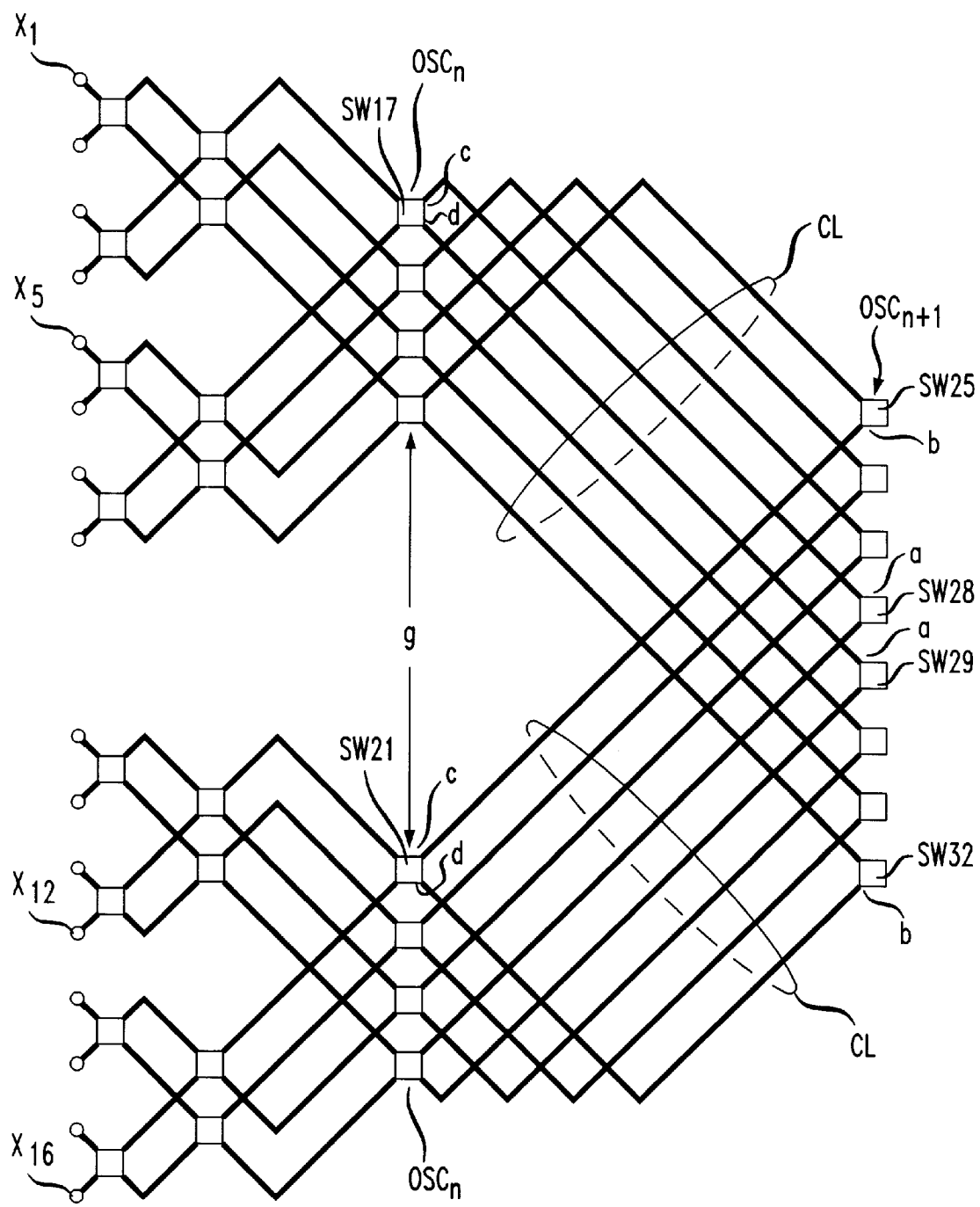

FIG. 5a shows the layout of $H_n$ for n=1. $H_1$ consists of a single switching circuit, the inputs of which are connected to $N=2^n=2^1=2$ network inputs. FIG. 5b shows the layout of $H_2$. $H_2$ includes two copies of $H_1$, i.e., $H_1^a$, $H_1^b$, disposed one above the other, and a final column $OSC_n$ of 2 switching circuits. The outputs from $H_n^a$ and $H_1^b$ are routed, via channel linking, to the switching circuits in column $OSC_n$. For $n \geq 3$, the layout is described recursively, and applies generally to FIGS. 5b–5d.

As mentioned above, and as now can readily be seen in FIGS. 5b–5d, $H_{n+1}$ comprises two copies of $H_n$, i.e., $H_n^a$ and $H_n^b$, situated one on top of the other. For example, in FIG. 5d, $H_4$ comprises two copies of $H_3$. There is a gap g (see FIG. 5d) between the lower-most switching circuit in the column $OSC_n$ of $H_n^a$ and the upper-most switching circuit in the column $OSC_n$ of $H_n^b$ in preferred embodiments, the gap g has a dimension of $\sqrt{2} \cdot (2^{n-1}+1)$ grid segments. The final column $OSC_{n+1}$ of switching circuits of $H_{n+1}$ is positioned so that the $2^n$ switching circuits contained in $OSC_{n+1}$ are located on the same rows as the middle $2^n$ network inputs. For example, in FIG. 5d, the switching circuits in $OSC_4$ are disposed, respectively, in the same rows as network inputs $X_5$–$X_{12}$. The spacing between adjacent switching circuits in $OSC_{n+1}$ and adjacent network inputs is $\sqrt{2}$ grid segments. The column $OSC_{n+1}$ of switching circuits is disposed $\sqrt{2} \cdot 3 \cdot (2^{n-2})$ grid segments to the right of the columns $OSC_n$ in $H_n^a$ and $H_n^b$. Note that unlike Wise's arrangement of the Butterfly network, in the present layout, the switching circuits from the various columns do not align into rows.

When the switching circuits are laid-out as described above, they can be interconnected by channel linking CL as follows. The lower output of each switching circuit in the column $OSC_n$ of $H_n^a$ is connected by a straight slanted channel link CL to the upper input of each of the lower half of the switching circuits in column $OSC_{n+1}$. The upper output of each switching circuit in the column $OSC_n$ of $H_n^b$ is connected by a straight slanted channel link CL to the lower input of each of the upper half of the switching circuits in column $OSC_{n+1}$. For example, in FIG. 5d, the lower output d of switching circuit SW17 is connected to upper input a of SW29, and the upper output c of switching circuit SW21 is connected to lower input b of SW25.

The upper output of each switching circuit in the column $OSC_n$ of $H_n^a$ is connected to the upper input of each of the upper half of the switching circuits in column $OSC_{n+1}$ in reverse order. The lower output of each switching circuit in the column $OSC_n$ of $H_n^b$ is connected to the lower input of each of the lower half of the switching circuits in column $OSC_{n+1}$ in reverse order. For example, in FIG. 5d, the upper output c of SW17 is connected to the upper input of SW28. The lower output d of SW21 is connected to the lower input b of SW32.

The channel links connecting the two aforementioned groups of outputs, i.e., the upper outputs of the switching circuits in $OSC_n$ of $H_n^a$ and the lower outputs of the switching circuits in column $OSC_n$ of $H_n^b$ to the switching circuits in $OSC_{n+1}$, require a single "bend" or direction change. In particular, the channel links from $H_n^a$ bends, preferably, at a row located $(\sqrt{2})/2$ grid segments above the upper-most switching circuit in column $OSC_n$ of $H_n^a$. For the channel links from $H_n^b$, the bends occur, preferably, at a row located $(\sqrt{2})/2$ grid segments below the lowermost switching circuit in column $OSC_n$ of $H_n^b$.

Figure 6:
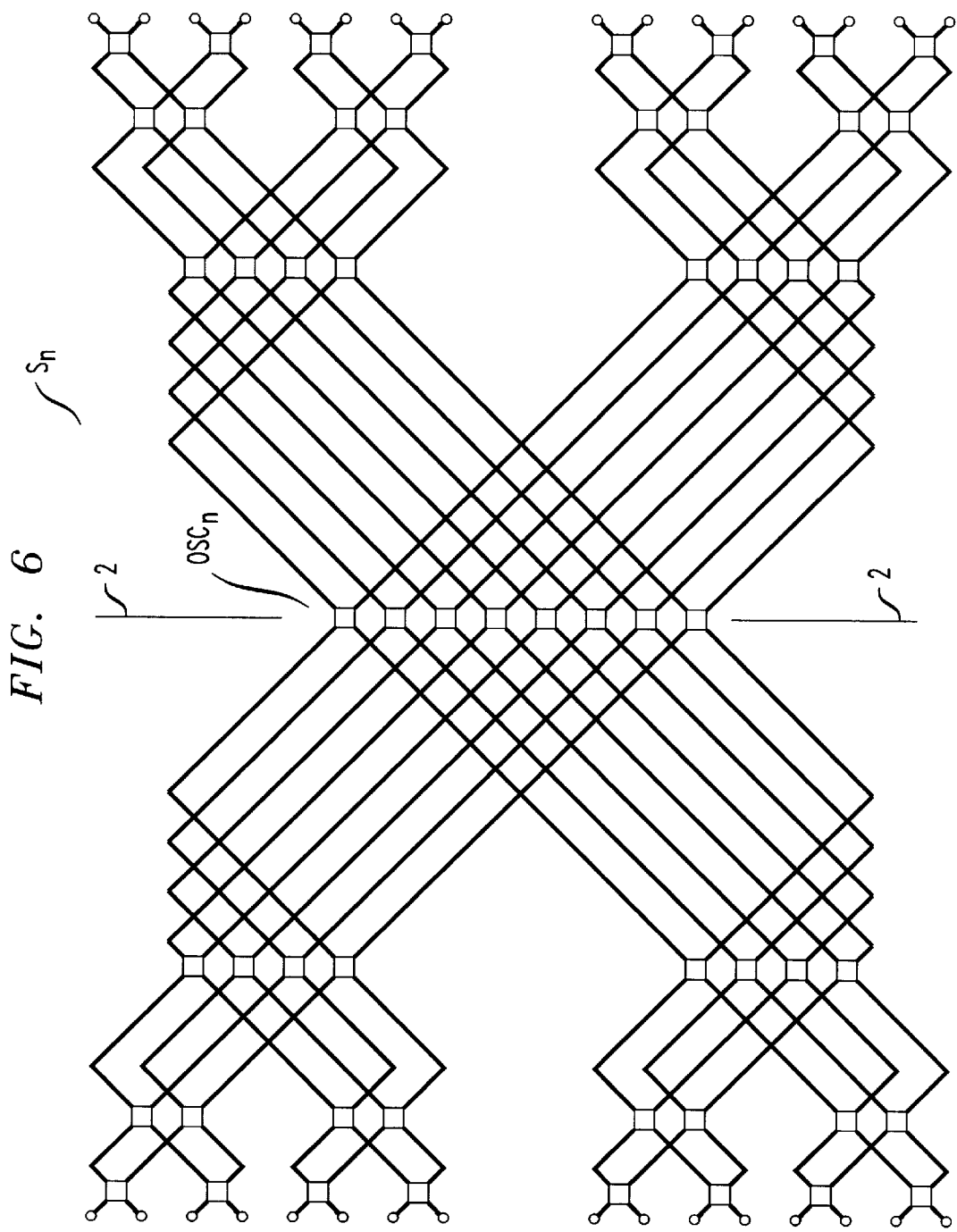
FIG. 6 shows a layout in accordance with the present invention of the complete Benes switching network for n=4.

FIG. 6 shows a complete layout for the Benes network $S_n$, according to the present invention, for n=4. The network $S_n$ is symmetric about an axis 2—2 passing vertically through the center of column $OSC_n$ of switching circuits. To the left of the axis 2—2 is a first copy of the butterfly network, $H_n$; to the right is a second copy of it. In the Benes network $S_n$, however, the column $OSC_n$ of $2^{n-1}$ switching circuits is common to both copies of $H_n$. In other words, each butterfly $H_n$ does not separately contribute its column $OSC_n$ of $2^{n-1}$ switching circuits to the Benes network.

The height of the half network $H_n$ (or $S_n$) is $\sqrt{2} \cdot (2^n-1)$ grid segments. The width increases by $\sqrt{2} \cdot 3 \cdot (2^{n-3})$ grid segments to obtain $H_n$ from $H_{n-1}$. Thus, the width of $H_n$ is $\sqrt{2} \cdot (3 \cdot (2^{n-2})-1)$ grid segments. Thus, the grid area for a layout of the Benes network for N inputs, in accordance with the present invention, has an upper bound grid area of $3N^2$ grid units.

In mathematical parlance, and as applied to the network area requirements, an "upper bound" area of $3N^2$ grid units means that the switching network can be implemented in $3N^2$ or fewer grid units. Thus, in the present context, it is advantageous to reduce the upper bound. It should be appreciated, however, that in other less preferred embodiments of the present invention, the Benes switching network can be implemented in an area greater than $3N^2$ grid units.

In particular, the location and spacing of the columns, bends, and the like, described above, allows the links within the network to be slanted at 45 degrees relative to a column defined by the network inputs (or relative to the various columns into which the switching circuits are arranged). The aforementioned arrangement obtains the minimum layout area according to the present invention. In other embodiments of the present invention, the links may be nonorthogonal to such columns, but not at 45°, or the links may contain more than one bend. Alternatively, the location of the bend in the links, or the position of the various columns of switching circuits may vary from the preferred embodiments described above. Layouts obtained using such other embodiments will have grid areas greater than $3N^2$ grid units. It is believed, however, that many of such embodiments will still represent an improvement, in terms of grid area requirements, over prior art layouts of the Benes network. Such embodiments are contemplated to be within the scope of the present invention.

Switching networks, such as the Benes switching network, may be used in a variety of applications. More particularly, they are useful in a variety of communications applications, such as, for example, broad band ISDN as well as in conventional data and/or telecommunications networks. See Weste and Eshraghian, *Principles of CMOS VLSI Design*, Section 9.4, (Addison Wesley, 1985). The improved layouts described herein may be used advantageously, in the same applications, to minimize the area required to physically implement the switching network on one or more integrated circuits.

Figure 7:
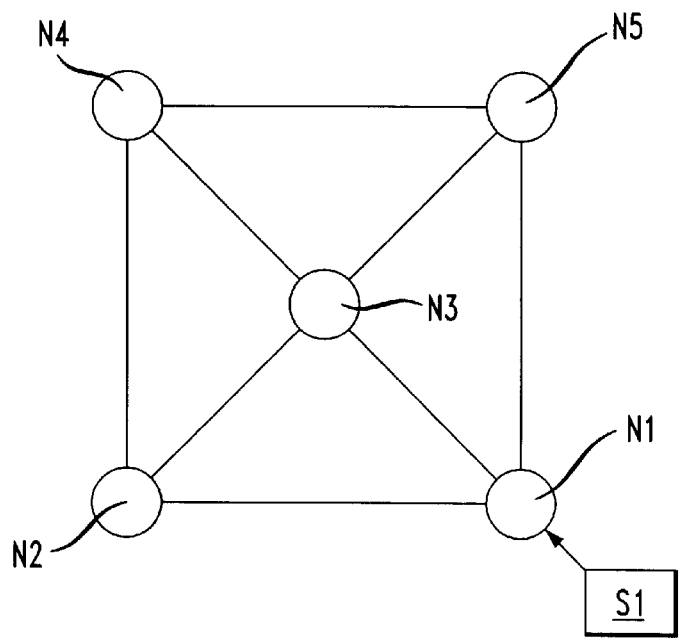
FIG. 7 shows a simplified diagram of a portion of an asynchronous transfer mode network.

In the following nonlimiting example, improved layouts according to the present invention are used as the "switch fabric" of an asynchronous transfer mode (ATM) switch. FIG. 7 shows a portion of an ATM network having nodes N1–N5. In the example shown in FIG. 7, a single source S1 delivers data onto the network at N1 for delivery to other nodes in the network, such as nodes N2–N5. It should be appreciated that in other embodiments, such a network may receive data from multiple sources. Each of the nodes has an ATM node switch, not shown in FIG. 7, for routing data to other nodes in the network. A simplified diagram of an ATM node switch according to the present invention is shown in FIG. 8.

Figure 8:
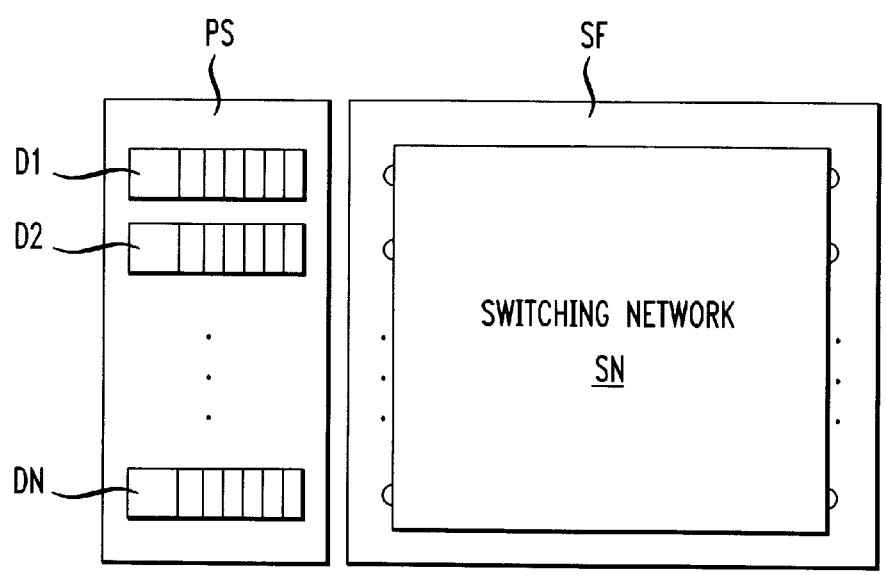
FIG. 8 shows a simplified diagram of a switch.

As shown in FIG. 8, data packets D1–DN are received by the ATM node switch and stored in buffers for preprocessing in preprocessing stage PS. In addition to information content, the data packets include routing or address data indicating the intended destination of the information content. In the preprocessing stage PS, decisions are made by known methods concerning the order of data flow into switch fabric SF, which is a switching network SN having an improved layout as described herein. From the buffers, the data is delivered synchronously into the switch fabric SF, and routed to the appropriate node.

Although specific embodiments of this invention have been described herein, they are merely illustrative of the many arrangements that can be devised in application of the principles of the invention. Numerous other arrangements can be devised in accordance with such principles by those skilled in the art without departing from the scope and spirit of the invention.

I claim:

1. A switching network for routing an input vector of N signals, the signals representative of values, comprising:

N network input terminals for receiving the signals, the network input terminals arranged in a first column;

a plurality of switching circuits, each switching circuit having first and second inputs for receiving two of the signals and operable to route the two received signals by directing one of the signals to a predetermined one of two outputs and directing the other signal to the other of the two outputs, wherein a controller predetermines to which ouptuts the signals are directed;

N network output terminals to which the signals are routed; and a plurality of links that connect a network input terminal to a switching circuit input for each of the N network input terminals, and for connecting a first switching circuit output to a second switching circuit input or a network output terminal for each of the switching circuits;

characterized in that, in a layout of the switching network, switching circuits of the plurality are arranged in groups aligned in one direction, but not two directions, and further wherein the layout is divisible into two mirror-image subnetworks along an axis of symmetry.

2. The switching network of claim 1, wherein the groups are columns.

3. The switching network of claim 2, wherein $N=2^n$, and wherein there are $2n-1$ columns of switching circuits, and wherein switching circuits in the n-th column are substantially aligned along a respective plurality of axes, each axis of the plurality running through one network input terminal in a middle-most group of $2^n-1$ network input terminals, wherein each axis is orthogonal to, and in the plane of, the first column of network input terminals, and further wherein the axis of symmetry is aligned with the n-th column of switching circuits.

4. The switching network of claim 3, wherein a substantial portion of each link extends in a substantially non-orthogonal direction to the first column of network inputs and the n columns of switching circuits.

5. The switching network of claim 4, wherein the substantially non-orthogonal direction is 45 degrees.

6. The switching network of claim 1, wherein the network is isomorphic to Benes switching network.

7. The switching network of claim 4, wherein substantially every link connected to the the first input of the switching circuits is aligned along a third direction, and substantially every link connected to the second input of the switching circuits is aligned along a fourth direction, which directions are orthogonal to one another, with respective orthogonally-disposed links defining a grid, and wherein a grid segment is defined by a separation between links aligned in the same third or fourth direction and connected to adjacent switching circuits in the n-th column, and further wherein the n-th column of switching circuits is located $\sqrt{2}(3 \cdot 2^{n-2}-1)$ grid segments away from the (n-1)th column of switching circuits.

8. The switching network of claim 7, wherein the (n-1)th column of switching circuits is divided into an upper column and a lower column, each column containing (N/4) switching circuits, and further wherein a gap between a (N/4)th switching circuit in the upper column and a ((N/4)+1)th switching circuit in the lower column has a dimension of ($\sqrt{2} \cdot (N/2+1)$) grid segments.

9. The switching network of claim 8, wherein channel links comprise the links connecting the outputs of switching circuits in the (n-1)th column to the inputs of switching circuits in the n-th column, wherein channel links connected to a first of the two outputs of each switching circuit in the upper column change directional alignment along a first axis spaced $(\sqrt{2})/2$ grid segments from a first switching circuit in the upper column, wherein the first axis is orthogonal to, and in the plane of, the columns defined by the switching circuits.

10. The switching network of claim 9, wherein channel links connected to a second of the two outputs of each switching circuit in the lower column change directional alignment along a second axis $(\sqrt{2})/2$ grid segments from a (N/2)th switching circuit in the lower column, wherein the second axis is orthogonal to, and in the plane of, the columns defined by the switching circuits.

11. The switching network of claim 4, wherein substantially every link connected to the the first input of the switching circuits is aligned along a third direction, and substantially every link connected to the second input of the switching circuits is aligned along a fourth direction, which directions are orthogonal to one another, with respective orthogonally-disposed links defining a grid, and wherein a first grid segment is defined by a separation between links aligned in the third direction and connected to adjacent switching circuits in the n-th column, and a second grid segment is defined by a separation between links aligned along the fourth direction and connected to adjacent switching circuits in the n-th column, and further wherein the layout of the sorting network requires an area of about $3N^2$ grid units, wherein a grid unit equals the product of the first and the second grid segment.

12. A switch for routing data signals to a network node, comprising:

a preprocessing stage for receiving the data signals including address information, and for ordering data signal flow; and a switch fabric that receives the ordered data signals from the preprocessing stage, the switch fabric including a switching network operable to route the data signals to an appropriate network node based on the address information of the signal, the switching network comprising:

N network input terminals for receiving the signals, the network input terminals arranged in a first column;

a plurality of switching circuits, each switching circuit having two inputs for receiving two of the signals and operable to route the two received signals by directing one of the signals to a predetermined one of two outputs and directing the other signal to the other of the two outputs, wherein a controller predetermines to which ouptuts the signals are directed;

N network output terminals to which the signals are routed; and a plurality of links that connect a network input terminal to a switching circuit input for each of the N network input terminals, and for connecting a first switching circuit output to a second switching circuit input or a network output terminal for each of the switching circuits;

characterized in that, in a layout of the switching network, switching circuits of the plurality are arranged in groups aligned in one direction, but not two directions, and further wherein the layout is divisible into two mirror-image subnetworks along an axis of symmetry.

* * * * *